I. MILLER.
SHOCK ABSORBER.
APPLICATION FILED AUG. 31, 1915.
1,177,790. Patented Apr. 4, 1916.
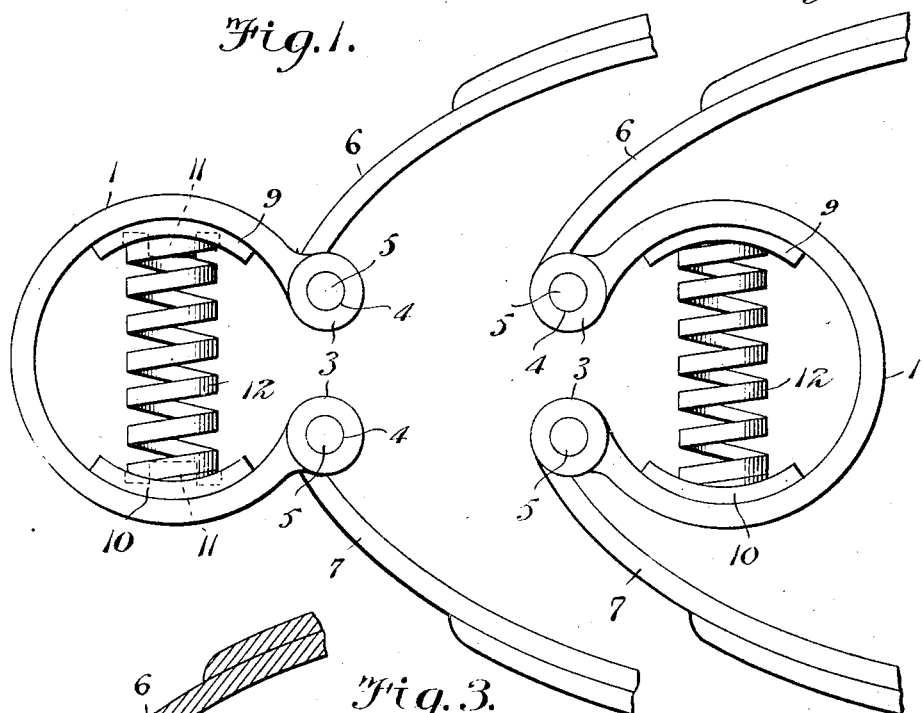
Witnesses
Frederick W. Ely
Wm J ...
Inventor
I. Miller
By Victor J. Evans
Attorney

UNITED STATES PATENT OFFICE.

ISRAEL MILLER, OF PAWTUCKET, RHODE ISLAND.

SHOCK-ABSORBER.

1,177,790.  Specification of Letters Patent.  Patented Apr. 4, 1916.

Application filed August 31, 1915. Serial No. 48,284.

*To all whom it may concern:*

Be it known that I, ISRAEL MILLER, a citizen of the United States, residing at Pawtucket, in the county of Providence and State of Rhode Island, have invented new and useful Improvements in Shock-Absorbers, of which the following is a specification.

The present invention relates to shock absorbers for vehicle springs.

In carrying out my invention it is my purpose to construct a shock absorber which may be easily and quickly applied to the ends of a vehicle spring and which is in the nature of an arched member or link constructed of spring material having arranged upon the inner face thereof oppositely disposed shoes and arranged between the said shoes is a helical spring exerting a tension between the opposite ends of the link and adapted when the vehicle springs are subjected to an undue strain to assist in resisting the strain by partially absorbing the same, so as to prevent any violent shock or jar incident to the vehicle traveling over uneven surfaces or from other causes.

Another object of the invention is to provide a shock absorber which shall be extremely simple and cheap and which may be easily and readily attached to or detached from the ends of an ordinary vehicle spring.

With the above and other objects in view, the improvement resides in the construction, combination and arrangement of parts set forth in the following specification and falling within the scope of the appended claims.

In the drawing: Figure 1 is an end view of the vehicle spring showing my improvement attached thereto, Fig. 2 is a similar view showing the improvement arranged between the end links of the spring, Fig. 3 is a central longitudinal sectional view through the same, and Fig. 4 is a perspective view of the improvement detached.

My improvement contemplates the employment of a round link, 1, the same being constructed of some heavy suitable resilient material and having its ends spread and bifurcated, and the end arms 3 provided by the said bifurcations having eyes provided with openings 4 through which are passed bolts 5 that secure the ends of the link to the end leaves 6 and 7 of a vehicle spring, the inner wall of the link is preferably provided with a circumferential slot or depression 8 which is adapted to contact with the sides of shoes 9 and 10, respectively, the said shoes being preferably disposed diametrically opposite each other adjacent the open end of the link. The shoes are sustained in proper position through the medium of an adjustable securing element in the nature of a screw bolt 10', and the inner faces of the links are provided with lugs or bosses 11 which surround the end convolutions of a helical spring 12. The link may be arranged either outwardly or inwardly of the ends of the spring, as illustrated in Figs. 1 and 2 of the drawings and by an arrangement as just described it will be noted that the resilient link and spring 12 will effectively absorb any shock to which the vehicle springs are subjected.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

1. A shock absorber, comprising a round spring link having spaced ends provided with ears which are secured to the ends of a vehicle spring, diametrically opposite shoes upon the inner face of the link, means for sustaining the shoes in the link, lugs formed with the inner faces of the shoes, and a helical spring surrounding the lugs and contacting with the shoes.

2. In a shock absorber, a round spring link having its ends bifurcated, the arms provided by the bifurcations formed with eyes, a vehicle spring having its ends separated and received within the bifurcated ends of the link, and means passing through the eyes and the ends of the springs for securing the link upon the spring, the inner face of the link having a circumferential channel, oppositely disposed blocks arranged within the channel and contacting with the side walls of the channel, screw members for securing the blocks upon the link, said blocks having their inner faces provided with lugs, a helical spring surrounding the lugs and exerting a tension between the oppositely disposed blocks.

In testimony whereof I affix my signature in presence of two witnesses.

ISRAEL MILLER.

Witnesses:
JAMES HENRY TAYLOR,
LOUIS ROCHELEAU.